Figure 1:
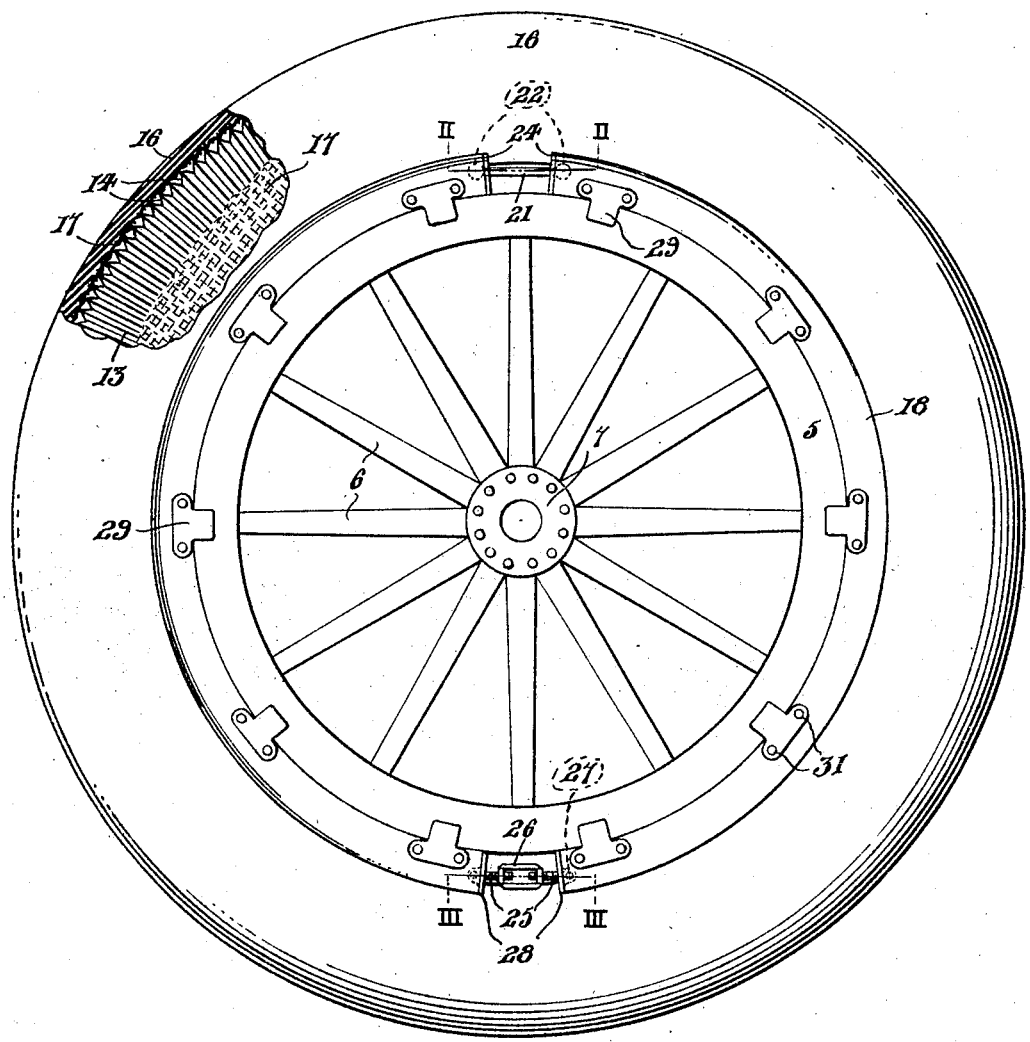

J. ROSICK.
CUSHION TIRE FOR VEHICLE WHEELS.
APPLICATION FILED FEB. 10, 1921.

1,394,358.

Patented Oct. 18, 1921.
2 SHEETS—SHEET 1.

Inventor
J. Rosick

J. ROSICK.
CUSHION TIRE FOR VEHICLE WHEELS.
APPLICATION FILED FEB. 10, 1921.
1,394,358.
Patented Oct. 18, 1921.
2 SHEETS—SHEET 2.
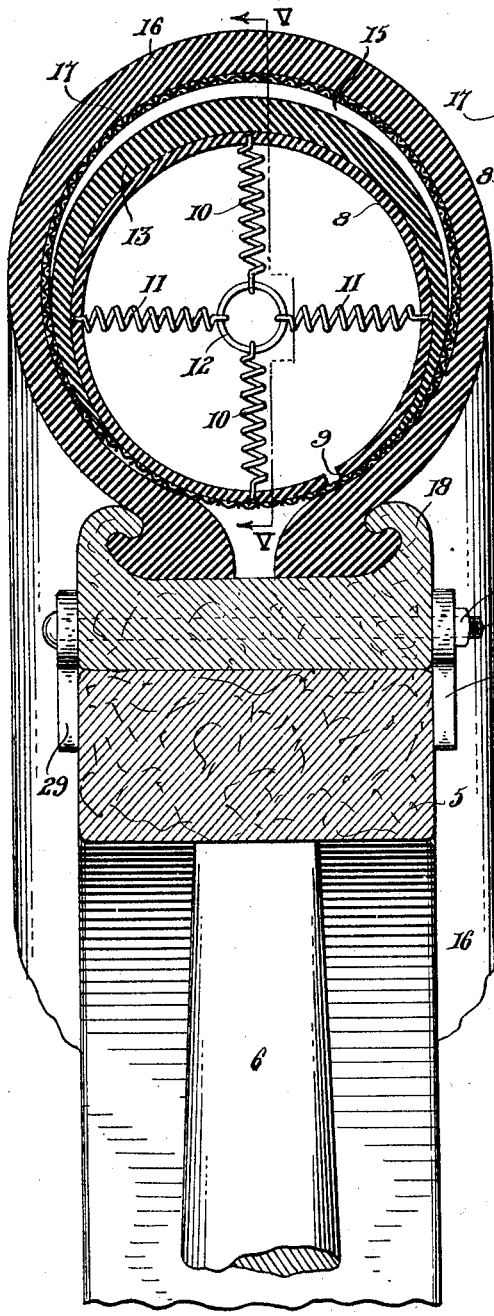
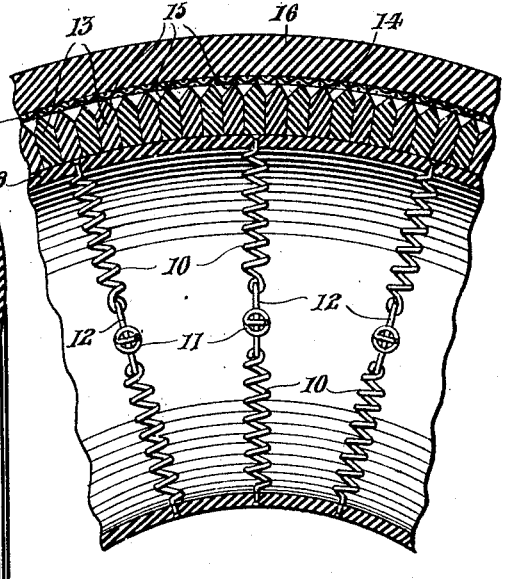
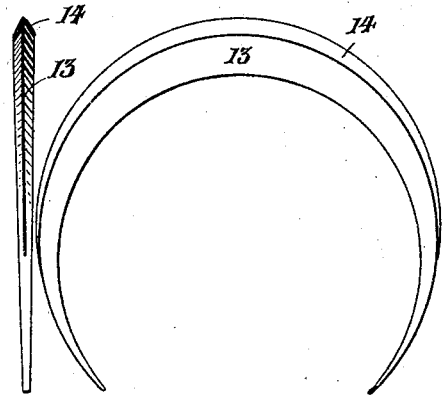
Inventor
J. Rosick
By F. B. Bryant
Attorney.

UNITED STATES PATENT OFFICE.

JOSEPH ROSICK, OF DAWSON, NEW MEXICO.

CUSHION-TIRE FOR VEHICLE-WHEELS.

1,394,358.  Specification of Letters Patent.  Patented Oct. 18, 1921.

Application filed February 10, 1921. Serial No. 443,909.

*To all whom it may concern:*

Be it known that I, JOSEPH ROSICK, a citizen of Poland, residing at Dawson, in the county of Colfax and State of New Mexico, have invented certain new and useful Improvements in Cushion-Tires for Vehicle-Wheels, of which the following is a specification.

This invention relates to certain new and useful improvements in cushion tires for vehicle wheels, and the principal object of the invention is to provide a device of this kind which shall be of such efficient and durable construction as to meet with all of the requirements for a successful commercial use and will particularly give the desired resiliency without the necessity of employing the usual inflatable inner tube.

Broadly considered, the invention resides in a split inner tube molded relatively stiff so as to assume a normal tubular form and provided with spring means to assist in resisting deformation of the same, this tube being placed within a somewhat ordinary form of tire shoe so as to leave a space between the latter and the tube of substantially crescent shape in cross section with the greatest area of the space at the tread portion of the device, and the crescent space being substantially filled by highly resilient members of substantially crescent shape in side elevation which partially embrace the tube between it and the shoe and which are arranged in side by side relation entirely about the tube. The crescent shaped members are confined on the tube by a sheath or the like so that the same together with the tube may be inserted within the shoe as a unit after being previously assembled.

With the above general objects in view, the present invention consists in the novel form, combination and arrangement of parts hereinafter more fully described and shown in the accompanying drawings, in which like reference characters indicate similar parts throughout the several views.

Figure 2:
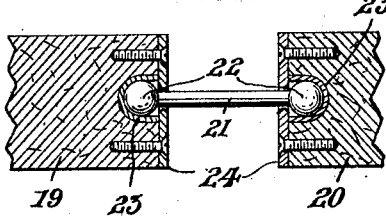
Figure 3:
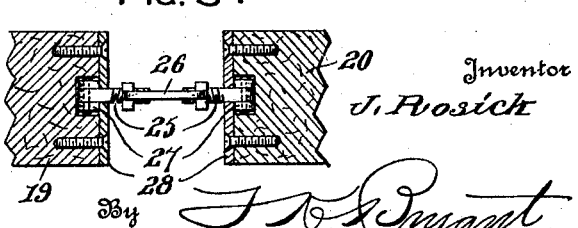

In the drawings,

Figure 1 is a side elevational view of a vehicle wheel equipped with a tire constructed in accordance with the present invention, the tire being shown partly broken away, Fig. 2 is a sectional view taken along line II—II of Fig. 1 to more clearly show a preferred form of rim for fastening the tire upon a wheel, Fig. 3 is a similar view taken along line III—III of Fig. 1, Fig. 4 is an enlarged radial sectional view of the device shown in Fig. 1, Fig. 5 is a sectional fragmentary view of the tire, the line of section being at right angles of Fig. 4 and upon line V—V of the latter, Fig. 6 is a side elevational view of one of the resilient crescent shaped members, and Fig. 7 is an edge view thereof.

Referring more in detail to the several views, the present invention aims to provide an improved tire adapted to be mounted upon the felly 5 of any form of vehicle wheel having its felly connected by spokes 6 in concentric relation to a hub 7.

The tire includes an inner tube 8 which is circumferentially split as at 9 at its inner portion and to one side of the medial line thereof, and this tube is preferably formed of molded material having considerable resiliency but sufficiently stiff to retain its circular form in cross section as shown in Fig. 4 under normal conditions. A plurality of spring devices are arranged within the tube 8 at intervals therearound and each of these spring devices embodies opposed radially positioned helical springs 10 and similar transversely disposed springs 11 fastened in any suitable manner at their outer ends to the tube 8 and connected centrally of said tube to a link or ring 12. It will thus be seen that when the tube 8 is caused to flatten by pressure upon its tread portion, the springs 10 are placed under compression for resisting such deformation of the tube 8 as would then obviously take place, and at the same time, the side portions of the tube 8 are caused to separate or expand under the resistance of the springs 11 which are then placed under tension. This spring arrangement is found necessary as it is not practical to give the tube 8 sufficient body to resist deformation to the desired extent, both from a practical and convenience of manufacture standpoint.

The tube 8 is partially embraced by a plurality of compressible or highly resilient and solid members 13 which are of substantially crescent form as shown in Fig. 6 and which are arranged in contiguous side by side relation as shown in Fig. 5 with the thickest portions of said members 13 positioned at the tread portion of the tube 8. In order to increase the resiliency of the members 13, they are reduced or beveled at their outer edges as at 14 so as to leave small spaces between the upper portions of the same as indicated at 15 in Fig. 5. In order to enable members 13 and tube 8 to be handled as a unit for convenience of inserting the same within the tire shoe 16, said members 13 and tube 8 are inclosed by a sheath or annular tube 17 which is preferably formed of fine wire mesh for also adding to the stiffness and resiliency of the tire, and it is obvious that such sheath will also serve to maintain the members 13 in their operative contiguous relation upon the tube 8.

The tire shoe 16 is preferably of the usual split and beaded type adapted to be held upon the felly 5 by a clencher rim 18, and such rim is preferably constructed as will presently be made apparent although other forms of rims may be employed if desired.

As shown more clearly in Figs. 1 to 4 inclusive, rim 18 is shown as composed of two half sections 19 and 20 respectively which are linked together at one pair of meeting ends of these sections by a rod 21 having ball heads 22 upon the opposite ends thereof, each pivotally engaging in a socket 23 countersunk in the ends of said sections 19 and 20 and confined in place together with the ball heads 22 by cover plates 24.

The other meeting ends of the rim sections 19 and 20 each have a threaded bolt 25 pivoted thereto, and these bolts are of opposite pitch and have threaded engagement with a turnbuckle nut 26 whereby the rim sections may be readily tightened upon the felly 5. Each bolt 25 is pivoted as at 27 between inwardly projecting ears of a plate 28 fastened upon the adjacent end of the member 19 and 20 having a central slot through which the bolt 25 extends and in which it may have limited swinging movement.

In order to additionally insure against lateral displacement of the rim 18 relative to the felly 5, a plurality of plates 29 are fastened against the opposite sides of the rim 18 so as to project inwardly and engage the side faces of the felly 5 as shown clearly in Figs. 1 and 4, and these plates are preferably fastened in pairs by passing a pair of bolts 30 through a plate at one side and entirely through the rim 18 to and through another plate at the opposite side of said rim, where nuts 31 are threaded upon the projecting ends of said bolts. These nuts can, of course, be quickly removed for removing the plates 29 at one side of the wheel whenever it is desired to remove the rim which is permitted after loosening the connection at one side of the wheel for turning the turnbuckle nut 26 in the proper direction.

It is believed that the construction and operation of the present invention as herein set forth and described will be readily understood and appreciated by those skilled in the art.

Minor changes may be made without departing from the spirit and scope of the invention as hereinafter claimed.

What is claimed as new is:—

1. A tire for vehicles including an inner tube circumferentially split and formed of relatively stiff deformable resilient material so as to normally assume a substantially circular cross sectional form, and a plurality of highly resilient members of substantially crescent form in elevation arranged in side by side contiguous relation and partially embracing said tube.

2. A tire for vehicles including an inner tube circumferentially split and formed of relatively stiff deformable resilient material so as to normally assume a substantially circular cross sectional form, a plurality of highly resilient members of substantially crescent form in elevation arranged in side by side contiguous relation and partially embracing said tube and a confining sheath of annular tubular form inclosing the tube and the crescent shaped members.

3. A tire for vehicles including an inner tube circumferentially split and formed of relatively stiff deformable resilient material so as to normally assume a substantially circular cross sectional form, a plurality of highly resilient members of substantially crescent form in elevation arranged in side by side contiguous relation and partially embracing said tube and a confining sheath of annular tubular form inclosing the tube and the crescent shaped members, said sheath being composed of fine wire mesh material.

4. A tire for vehicles including an inner tube circumferentially split and formed of relatively stiff deformable resilient material so as to normally assume a substantially circular cross sectional form, a plurality of highly resilient members of substantially crescent form in elevation arranged in side by side contiguous relation and partially embracing said tube, the outer edges of said crescent shaped members being beveled so as to leave slight spaces between the outer portions of the same.

5. A tire for vehicles including an inner tube circumferentially split and formed of relatively stiff deformable resilient material so as to normally assume a substantially circular cross sectional form, a plurality of highly resilient members of substantially crescent form in elevation arranged in side by side contiguous relation and partially embracing said tube, and a plurality of circumferentially arranged spaced spring devices fastened at intervals within said tube and each including opposed radially extending helical springs and opposed transversely disposed helical springs attached at their outer ends to the tube and interconnected centrally of the tube at their inner ends.

6. In combination with a tire shoe and an inner tube of relatively stiff material normally assuming a circular cross sectional form and of such size as to leave a cross sectional space of substantially crescent form between the same and the shoe with the wider portion of the space at the tread portion of the tire, of a plurality of highly resilient members arranged in said space and disposed in side by side contiguous relation and partially embracing said tube as well as contacting the latter and substantially filling the space between it and the shoe.

In testimony whereof I affix my signature in presence of two witnesses.

JOSEPH ROSICK.

Witnesses:
A. W. HALL,
W. C. HOLMAN.